US009577869B2

(12) United States Patent
Della Corte et al.

(10) Patent No.: US 9,577,869 B2
(45) Date of Patent: Feb. 21, 2017

(54) COLLABORATIVE METHOD AND SYSTEM TO BALANCE WORKLOAD DISTRIBUTION

(71) Applicant: International Business Machines Corporation, Armonk, NY (US)

(72) Inventors: Gianluca Della Corte, Rome (IT); Alessandro Donatelli, Rome (IT); Antonio M. Sgro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 14/012,551

(22) Filed: Aug. 28, 2013

(65) Prior Publication Data

US 2014/0068082 A1    Mar. 6, 2014

(30) Foreign Application Priority Data

Aug. 28, 2012  (GB) .................................. 1215214.6

(51) Int. Cl.
*G06F 15/173*     (2006.01)
*H04L 29/08*      (2006.01)

(52) U.S. Cl.
CPC ..... *H04L 29/08171* (2013.01); *H04L 67/1008* (2013.01)

(58) Field of Classification Search
CPC ........................ H04L 29/08171; H04L 67/1008
USPC ......... 709/226, 224; 455/419; 718/104, 105; 370/235
See application file for complete search history.

(56) References Cited

U.S. PATENT DOCUMENTS 8,122,132 B2    2/2012  Arimilli et al.
2004/0216114 A1  10/2004  Lin 2007/0169042 A1*  7/2007  Janczewski ............. G06F 8/314
                                                 717/149
2008/0178192 A1   7/2008  Dillenberger et al.
2008/0268828 A1* 10/2008  Nagaraja ................. G06F 9/505
                                                 455/419

(Continued)

FOREIGN PATENT DOCUMENTS

CN    CN101604264 A    12/2009

OTHER PUBLICATIONS

Chin Lu, An Adaptive Load Blancing Algorithm for Heterogeneous Distributed Systems with Multiple Task Classes, May 1996.*

(Continued)

*Primary Examiner* — Thuong Nguyen
(74) *Attorney, Agent, or Firm* — Yee & Associates, P.C.; Richard A. Wilhelm (57)  ABSTRACT

A method, system and program product for balanced workload distribution in a plurality of networked computing nodes. The networked computing nodes may be arranged as a connected graph defining at least one direct neighbor to each networked computing node. The method comprises determining a first workload indicator of the i-th computing node, at a first stage before a new task may be started by the i-th computing node, determining an estimated workload indicator of the i-th computing node, assuming that the new task is performed at a second stage on the i-th computing node, determining estimated workload indicators of each direct neighbor assuming that the new task is performed at the second stage, deciding whether to move the new task to another computing node, and moving the new task to one of the direct neighboring computing nodes of the i-th computing node such that workloads are balanced.

2 Claims, 6 Drawing Sheets

(56) References Cited

U.S. PATENT DOCUMENTS

| | | |
|---|---|---|
| 2009/0260012 A1 | 10/2009 | Borghetti et al. |
| 2011/0022706 A1 | 1/2011 | Borghetti et al. |
| 2011/0047554 A1 | 2/2011 | Lakshmanan et al. |
| 2013/0077494 A1* | 3/2013 | Samdanis .............. H04B 7/155 370/235 |
| 2013/0254384 A1* | 9/2013 | Wray ...................... H04L 43/08 709/224 |

OTHER PUBLICATIONS

Bansal et al., "Adaptive Decentralized Load Sharing Algorithms with Multiple Job Transfers in Distributed Computing Environments," International Journal of Recent Trends in Engineering, vol. 2, No. 2, Nov. 2009, pp. 217-221.

Kumar et al., "A Study on the Assessment of Load Balancing Algorithms in Grid Based Network," International Journal of Soft Computing and Engineering (IJSCE), vol. 2, No. 1, Mar. 2012, pp. 402-405.

Lu et al., "An Adaptive Load Balancing Algorithm for Heterogeneous Distributed Systems with Multiple Task Classes," Proceedings of the 16th International Conference on Distributed Computing Systems, May 1996, pp. 629-636.

\* cited by examiner

COLLABORATIVE METHOD AND SYSTEM TO BALANCE WORKLOAD DISTRIBUTION

CROSS-REFERENCE TO RELATED APPLICATION(S)

This application claims the benefit of priority to United Kingdom Patent Application Serial No. 1215214.6, filed on Aug. 28, 2012, the contents of which are hereby incorporated by reference.

FIELD OF THE INVENTION

The invention relates generally to a balanced workload distribution. The invention relates further to a computing node, a computing system, a data processing program, and a computer program product.

BACKGROUND OF THE INVENTION

Modern computing centers typically operate with a network of computers, computing nodes, or computing systems. In many cases, the hardware systems are abstracted to operating systems by means of a virtualization layer. This typical set-up of cloud computing centers—even without virtualization—satisfies the requirement of users or customers of computing centers to distribute workloads among different systems in order to have a higher total throughput because of a better utilization of individual systems. For the computing center management it means to organize a meaningful distributing of workloads among the computing systems in order to achieve a balance of workloads among the different computing systems. This may make best use of available resources.

There are several disclosures related to a balanced workload distribution. For example, Document U.S. Pat. No. 8,122,132 B2 discloses a technique for operating a high performance computing cluster (HPC) having multiple nodes (each of which includes multiple processors), wherein the technique includes periodically broadcasting information, related to processor utilization and network utilization at each of the multiple nodes, from each other of the multiple nodes to remaining ones of the multiple nodes. Respective local job tables, maintained in each of the multiple nodes, are updated based on the broadcast information. One or more threads are then moved from one or more of the multiple processors to a different one of the multiple processors (based on the broadcast information in the respective local job tables).

In another document, US201122706A1, a method is disclosed which provides an automatic and optimized selection of the network topology for distributing scheduling of jobs on the computers of the modified network topology. The automatic and optimized selection of the network topology starts from the current topology and a desired number of additional connections. In this way, the method of the present invention provides a higher convergence speed for the modified consensus algorithm in comparison, e.g., to a simple ring network. The method exploits the so-called small-world networks.

However, the current approaches to realize a workload distribution are based on splitting the workload between servers using a centralized approach. This may have some limitations in terms of scalability, adaptability and optimization of resources utilization. In addition, it may be quite complex to adapt the resource utilization when the workload is randomly generated by the computing nodes within the network itself.

Thus, there may be a need to overcome the above-mentioned limitations of a centralized approach for workload distribution in a network of computing nodes, and to provide a balanced workload distribution which is more dynamic and adaptable.

SUMMARY OF THE INVENTION

This need may be addressed by a method for balanced workload distribution, a computing node, a computing system, a data processing program, and a computer program product according to the independent claims.

According to one embodiment, a method for a balanced workload distribution may be provided. The method may be operable to distribute the workload in a plurality of networked computing nodes. The networked computing nodes may be arranged as a connected graph defining at least one direct neighbor to each networked computing node. The method may comprise determining a first workload indicator $x_i(k)$ of the i-th computing node out of the plurality of the networked computing nodes, at a first stage k before a new task may be started by the i-th computing node, determining an estimated workload indicator $y_i(k+1)$ of the i-th computing node, assuming that the new task would be performed at a second stage k+1 on the i-th node, and determining estimated workload indicators $y_j(k+1)$, j≤n, of each n direct neighbor of the i-th computing node assuming that the new task would be performed at the second stage k+1. Based on these determinations, the method may also comprise deciding whether to move the new task to one of the n direct neighboring computing nodes of the i-th computing node based on a decision protocol. This decision protocol may comprise the first workload indicator $x_i(k)$ of the i-th computing node at stage k, the estimated workload indicator $y_i(k+1)$ of the i-th computing node at stage k+1, the first workload indicators $x_j(k)$ of each of the direct neighboring computing nodes to the i-th computing node at stage k, and the estimated workload indicators $y_j(k+1)$ of each of the direct neighboring computing node j to the i-th computing node at stage k+1, and then moving the new task to one of the direct neighboring computing nodes of the i-th computing node, if it is decided to move the new task, such that workloads are balanced within the plurality of networked computing nodes.

According to another embodiment, a computing node may be provided. The computing node may be connectable to a plurality of networked computing nodes. The networked computing nodes may be arranged as a connected graph defining at least one direct neighbor to each networked computing node. The computing node may comprise a first determining unit adapted for determining its first workload indicator $x_i(k)$ as the computing node out of the plurality of the networked computing nodes, at a first stage k before a new task is started by the computing node, and a second determining unit adapted for determining an estimated workload indicator $y_i(k+1)$ of the computing node, assuming that the new task is performed at a second stage k+1 on the computing node as well as a third determining unit adapted for determining estimated workload indicators $y_j(k+1)$, j≤n, of each of the n direct neighbors of the i-th computing node assuming that the new task is performed at the second stage k+1. Additionally a decision unit may be provided which may be adapted for deciding whether to move the new task to one of the n direct neighboring computing nodes of the computing node based on a decision protocol. The decision protocol may comprise the first workload indicator $x_i(k)$ of the computing node at stage k, the estimated workload indicator $y_i(k+1)$ of the computing node at stage k+1, the first workload indicators $x_j(k)$ of each of the direct neighboring computing nodes to the computing node at stage k, and the estimated workload indicators $y_j(k+1)$ of each direct neighboring computing node j to the i-th computing node at stage k+1. The computing node may also comprise a moving unit adapted for moving the new task to one of the direct neighboring computing nodes of the i-th computing node if it is decided to move the new task such that workloads are balanced within the plurality of networked computing nodes.

According to yet another embodiment, a networked system may be provided which may comprise a plurality of networked computing nodes as explained above.

It may be noted that the computing nodes may be arranged in a connected graph, in particular, in a topology that builds a connected graph such that each node may be reached starting from any computing node using the network connections from node to node. It may also be worthwhile mentioning that the workload indicator may—in particular—be a scalar parameter having discrete values or a vector of scalar parameters with related parameter values, like CPU usage, memory usage, network usage, or other parameters which may be described and be characterized for a utilization and a related workload of a computing node see also above.

BRIEF DESCRIPTION OF THE DRAWINGS

Preferred embodiments of the invention will now be described, by way of example only, and with reference to the following drawings.

DETAILED DESCRIPTION

In the context of this application, the following conventions, terms and/or expressions may be used:

The term "connected graph" may denote a topology of computing nodes such that each node may be reachable starting from any computing node. There may not only be one path to reach a node, but several. But at least one path may exist such that isolated subsystems may not exist.

The term "workload indicator" may denote one or more parameter(s) characterizing a computing node. It may be expressed as a scalar value, or alternatively it may be a vector of different parameters like CPU usage, memory usage, network usage, I/O rate, number of processes managed, number of treads processed in parallel. All of these parameters may be time dependent and may be measured or determined for different pre-definable time intervals. This setting may de definable by a user. Alternatively, the relevant parameters may be determined automatically by the computing nodes based on workload patterns which may depend on times in a day, day in a week, other time intervals, or users being online, workloads being processed, predefined workload parameters for which certain contract conditions may be predefined, etc.

The term "workload distribution" may denote a measure for the balance of workloads on the computing nodes in a related network. In case of an equal workload distribution" all computing nodes—or only a predefined sub-group—may have a similar workload at a given point in time. It may describe a situation where the workload of all computing nodes may nearly be equal.

"Networked computing nodes" may denote computer systems that may be connected using known network technologies and protocols. The computing nodes may each be an individual computer with its own housing or chassis. Alternatively, a couple or all computing nodes may be in a common housing like in a blade system or they may be arranged in a common rack. They may be part of a high performance system or only a core system with a CPU and memory as typically used in multiprocessors—or also multicore systems.

The term "direct neighbor" or "direct neighboring computing node" may denote a next neighbor of a computing node in the definition of a connected graph. It may mean that one computing node may be reached without having to pass another member of the connected graph. These computing nodes may have a direct network or other direct links—e.g., wireless links—between them.

A "first workload indicator" may denote a workload indicator of a related computing node. It may describe a utilization of resources of the computing node. Each and every resource available in the computing node and its related utilization may be used as the first workload indicator. Examples are given below.

The "CPU usage" may denote an example of the workload indicator. It may be measured in a percentage during which the CPU may be in idle mode, the number of threads being computed by the processor, the number of task switches per time interval, the split between different units or sub-processors of the processors, e.g., floating point unit and fixed point unit, etc.

The term "memory usage" may denote a parameter related to the utilization of the memory of a computing node. It may be another example of a workload indicator. It may relate to the main memory, the internal or cache memory or external memory, or any combination thereof. The utilization may be measured over a period of time, i.e., in time intervals. It may be a percentage of available memory, or memory not be used by an operating system anyway, i.e., free accessible memory.

The term "computing node response time" may also be an example of a first, or simply, workload indicator. The response time may be a time before delivering a result after a task has been started. As task, a standard task may be referenced in order to have comparable results. Response time may also be an indication for a combined response including I/O time, computing time and network delay.

A "new task" for a computing node may denote a new workload, a new process or a new thread, or the like. The computing of the new task may not have started in order to call it a new task. Before the new task may be started, a couple of decisions may have to be made, e.g., whether to start the new task in the current computing system or in another one. In this context, "move the new task" may denote to pass the task on—e.g., physically transfer the new task to another computing node using networks—to a neighboring computing node in order to proceed with the task in the neighboring computing node or handle it otherwise.

The "estimated workload indicator" may denote a value of a workload indicator assuming that the new task may be performed at a computing node. However, a related value may not only reflect—i.e., being determined based on—the workload and related parameter(s) of the actual or current computing node, but also the workload indicator(s) of the direct neighboring computing nodes. This is in contrast to the first workload indicator which is a measure for an actual workload of a computing node. For this, no neighboring workloads may be taken into account.

It may be understood that the term "workload indicator" may be a parameter related to one of the above-mentioned examples or any parameter that may describe a utilization of a computing node. It may also be understood that any combination of individual parameters may be combined or used as a vector comprising a plurality of parameters.

The proposed method for balanced workload distribution may offer a couple of advantages:

Based on the new method, a balancing of the workloads of a connected group of computing nodes may be based on a consensus algorithm that may allow balancing the workload on a network of computing nodes using a collaborative method. The method may allow fully utilizing the machine or computing resources within the network without using any centralized components for job or workload assignment, job load estimation and job repository. The centralized approach is very much used in the state-of-the-art solutions.

In this new way disclosed here, using the inventive modified consensus algorithm in the computing nodes, the workload balancing and resources utilization within the network of computing resource may be improved, i.e., more balanced. This may save resources in form of additional computing nodes, power, programming requirements, systems management overhead, time to reach a balanced status, and the like.

This solution may be based on a logical topology based on a neighboring concept of the computing nodes. It also involves at least one workload indicator in terms of used resources (e.g., CPU usage, memory usage, response time, network usage, etc.) directly evaluated by each node. Also reflected may be an "estimated workload indicator" associated to each elaboration or new task. It may, e.g., be based on a number of items or data to be analyzed by the new task, on logic complexity to be applied to this data and the type of hardware and operating system available. Furthermore, the modified average consensus algorithm is part of the solution as well as a reallocation/decision paradigm or decision protocol allowing each note to choose if the computation may be executed locally on the computing node, or if it may be passed on to one of its direct neighbors. So, the advantage may be summarized as providing a method and system being able to optimize the resource utilization in a fast way and avoid the total system to diverge, which may be guaranteed by the consensus algorithm.

According to one embodiment of the method, the decision protocol may be defined by $$\max\{(\max[y_j(k+1)-x_j(k)]); [y_i(k+1)-x_i(k)]\}$$

for all j≤n, wherein
- $y_j(k+1)$ may be the estimated workload indicator of one of the direct neighboring computing nodes to the i-th computing node at stage k+1—which may be the stage where the new task may be dealt with,
- $x_j(k)$ may be the workload indicator of one of the direct neighboring computing nodes to the i-th computing node at stage k—meaning without the new task being processed,
- $y_i(k+1)$ may be the estimated workload indicator of the i-th computing node at stage k+1,
- $x_i(k)$ is the workload indicator of the i-th computing node at stage k, and
- n is the number of direct neighboring computing nodes to the i-th computing node.

The above decision protocol may define that a new task may be moved to the node having the biggest increase in its estimated workload indicator.

According to one embodiment of the method, each workload indicator may be based on at least one out of the group consisting of CPU usage, memory usage, computing node response time, network traffic, and disk I/O traffic, or a combination thereof. Thus, it may be a scalar value or a vector, combining more than one of the parameters. The formula $$x = \sum_{i=1}^{R} a_i m_i$$

may define such multiple resources, wherein "x" may be a vector of a workload indicator, "R" may be the number of resources, "a" may be a scaling factor, and "m" may be a metric for each resource indicative of a workload of that resource "I". An alternative writing would be $$\vec{x} = \text{diag}(\beta)\vec{m},$$

wherein $\vec{x}$ may be the vector of the workload indicator, "β" may be a matrix of the scaling factors "$a_i$", and $\vec{m}$ may be the vector of the metrics.

This way, a flexible basis may be established reflecting different workload situations in a cloud computing center, e.g., batch job heavy, interaction heavy, infrastructure heavy, database heavy, balanced mix of workloads, etc.

According to one more embodiment of the method, for the new task each estimated workload indicator may be based on the respective workload indicator combined with one out of the group consisting of a number of items to be analyzed by the new task, logic complexity of the new task to be applied to related data, type of hardware used for a computing node, operating system of the computing node, and additionally involved hardware and/or software components. The items may be a measure for data points to be involved. It may also be a counter for tables in a database being involved, rows or columns in the database, number of different data types, etc.

The item to be analyzed may be anything that the new task may address, e.g., data, data structures, database tables, database rows, database columns, number of threads, complexity of threads, images, files in a file-system, dependencies between data, etc.

According to an enhanced embodiment of the method, the estimated workload indicator $y_i(k+1)$ at stage k+1 of the i-th computing node may be determined by $$y_i(k+1) = \frac{1}{(n+1)(x_i(k) + \sum_{j=1}^{n} [x_j(k)])},$$

wherein
"n" may be the number of direct neighboring computing nodes to the i-th computing node,
$x_i(k)$ may be the first workload indicator of the i-th computing node at stage "k",
$x_j(k)$ may be the first workload indicator of one of the "n" direct neighboring computing node at stage "k".

This makes clear that no centralized approach is used and the estimated workload indicator of the i-th computing node also reflects the workloads of the direct neighboring computing nodes. This makes the inventive concept and the modified consensus algorithm pretty clear.

According to a further enhanced embodiment of the method, the estimated workload indicator $y_j(k+1)$ at stage k+1 of one of the direct neighboring computing nodes to the i-th computing is determined by $$y_j(k+1) = \frac{1}{(m+1)(x_j(k) + \sum_{c=1}^{m} [x_c(k)])},$$

wherein
"m" may be the number of direct neighboring computing nodes to the one of the direct neighboring computing node of the i-th computing node,
$x_j(k)$ may be the first workload indicator of the j-th computing node which may be a direct neighbor to the i-th computing node at stage "k",
$x_c(k)$ may be the first workload indicator of one of "m" direct neighboring computing nodes to one of the direct neighboring computing nodes to the i-th computing node at stage "k".

Thus, the estimated workload indicators of the direct neighbors of the i-th computing node also determine their estimated workload indicators in the same way it may be performed for the i-th computing node. Thus, the concept may be consistent across the network of computing nodes. This may help reducing determination routines and may keep the systems management at a reasonable level.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for balanced workload distribution is given. Afterwards, further embodiments of a computing node adapted to perform the method will be described.

Figure 1:
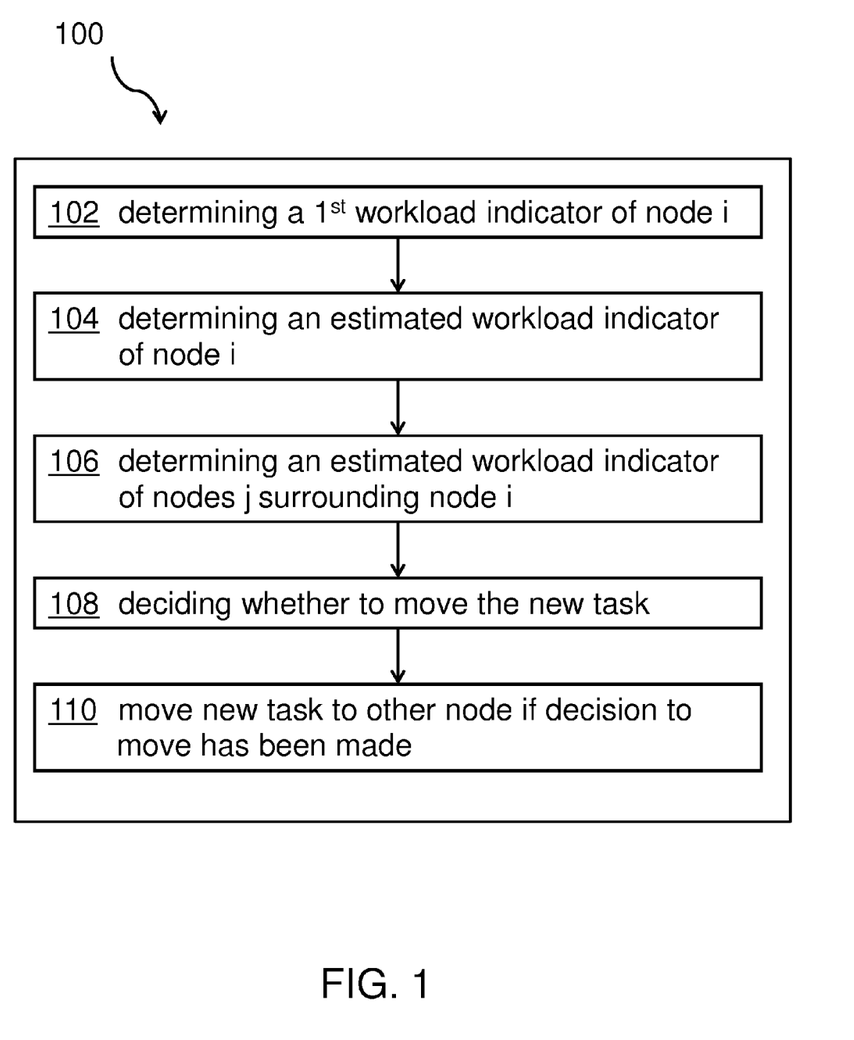
FIG. 1 shows a block diagram of an embodiment of the inventive method for workload distribution.

FIG. 1 shows a block diagram of an embodiment of the method 100 for workload distribution in a plurality of networked computing nodes. The networked computing nodes being arranged as a connected graph such that each node may be reached starting from any computing node and defining at least one direct neighbor to each computing node in the network. The method may comprise determining, 102, a first workload indicator $x_i(k)$—which may be a scalar parameter or a vector as explained above—of the i-th computing node out of the plurality of the networked computing nodes, at a first stage k—meaning a first time instance—before a new task may be started by the i-th computing node. Furthermore, the method may comprise determining, 104, an estimated workload indicator $y_i(k+1)$ of the i-th computing node, assuming that the new task may be performed at a second stage k+1—meaning at a later point in time than the first instance of time—on the i-th node. Additionally, the method may comprise determining, 106, estimated workload indicators $y_j(k+1)$, j≤n, of each n direct neighbors of the i-th computing node assuming that the new task may be performed at the second stage k+1, and deciding, 108, whether to move the new task to one of the n direct neighboring computing nodes of the i-th computing node. This decision may be based on a decision protocol comprising the first workload indicator $x_i(k)$ of the i-th computing node at stage k, the estimated workload indicator $y_i(k+1)$ of the i-th computing node at stage k+1, the first workload indicators $x_j(k)$ of each of the direct neighboring computing nodes to the i-th computing node at stage k, and the estimated workload indicators $y_j(k+1)$ of each of the direct neighbor computing nodes j to the i-th computing node at stage k+1. Moreover, the method may comprise moving, 110, the new task to one of the direct neighboring computing nodes of the i-th computing node if it is decided to move the new task, such that workloads are balanced within the plurality of networked computing nodes. With this, the above-mentioned advantages may be realized.

Figure 2:
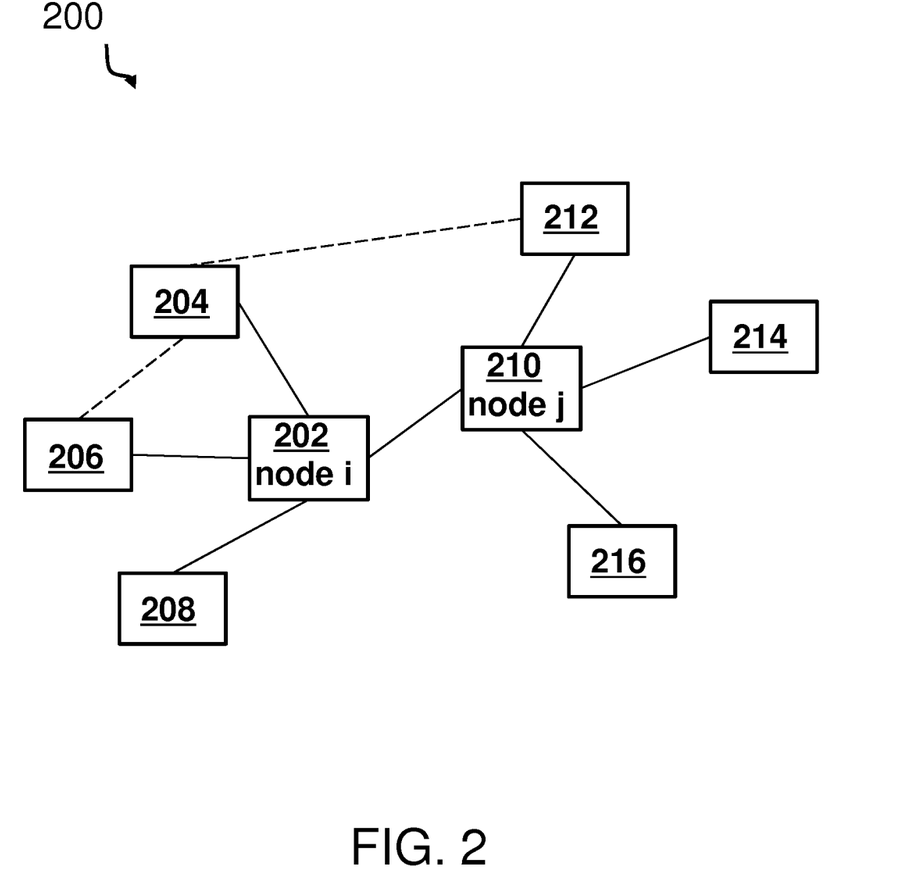
FIG. 2 shows a block diagram of an embodiment of a network of computing nodes in a connected graph.

FIG. 2 shows a block diagram of an embodiment of a network 200 of computing nodes 202, 204, 206, 208, 210, 212, 214, 216 in an exemplary topology of a connected graph. Worthwhile mentioning may be the i-th computing node 202 and the j-th computing node 210. The i-th computing node 202 may have—in the exemplary network topology shown—four direct neighboring computing nodes 204, 206, 208 and 210. Similarly, the computing node 210 has direct neighboring computing nodes 202, 212, 214, 216. The same logic may apply to any other computing node. Computing nodes may also have multiple connections as indicated by the exemplary dashed lines. A concept of a connected graph may also be recognizable in FIG. 2: each node of the network may be reached starting from any node. Sub-network without a connection to the rest of (computing) nodes may not exist.

Figure 3:
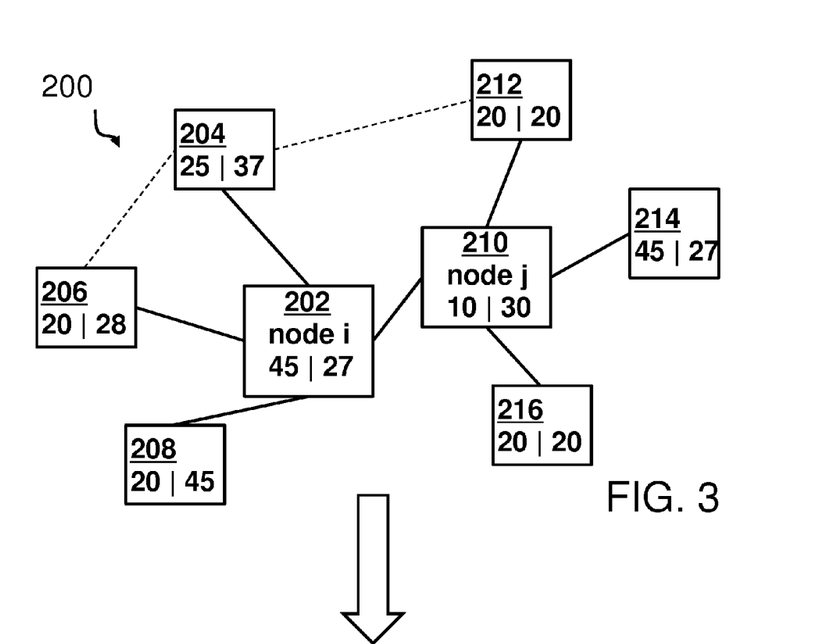
FIG. 3 shows a block diagram of an embodiment of a network of computing nodes with workload indicator value examples, as well as examples of values of estimated workload indicators.

FIG. 3 shows a block diagram of the embodiment of a network of computing node of FIG. 3 with workload indicator value examples as well as examples of values of estimated workload indicators. Both values may be separated by a vertical line. The left value in each box of a computing node below the reference numeral may denote the first workload indicator and the right number may denote an estimated workload indicator of the specific computing node. E.g., computing node 202 may have a first workload indicator of "45" and an estimated workload indicator of "27" at a later stage in time assuming a new task may be performed. This logic may apply—mutatis mutandis—to all computing node symbols in the FIGS. 3, 4, 5 and 6.

Figure 4:
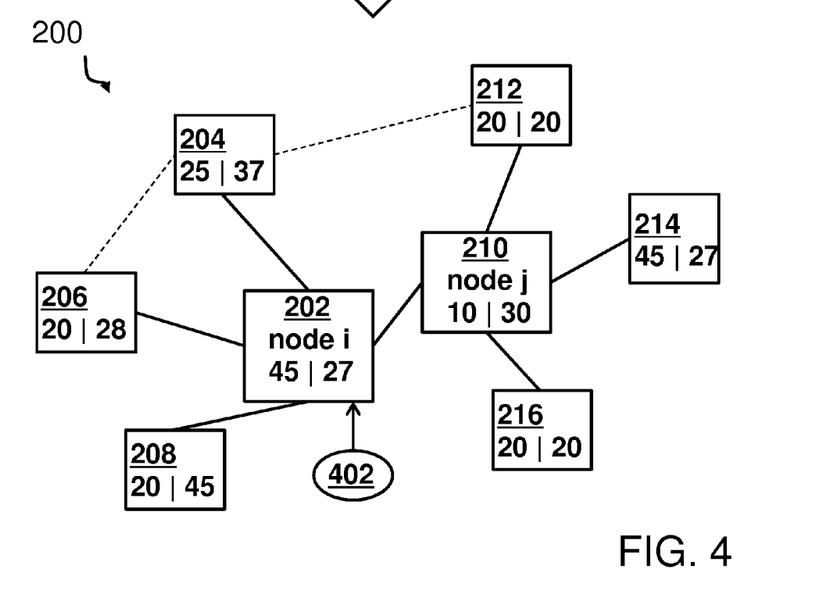
FIG. 4 shows an embodiment of a network of computing nodes, where a new task may have to be performed.

FIG. 4 shows an embodiment of the network 200 of computing nodes as described above. Here, a new task 402 may have to be performed by the i-th computing node 202. The first workload indicators and the estimated workload indicators may show no change yet.

Figure 5:
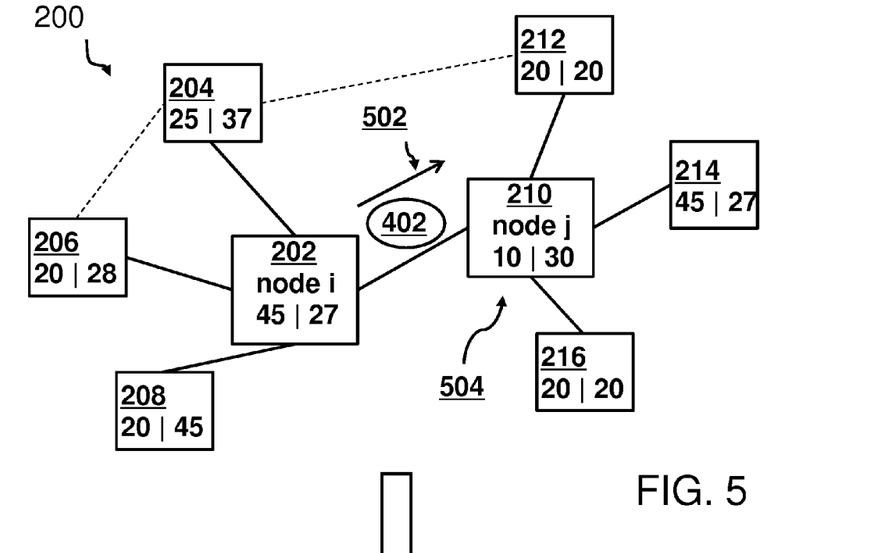
FIG. 5 shows an embodiment of the network of computing nodes, wherein the new task is in transition to a new computing node.

FIG. 5 shows an embodiment of the network 200 of computing nodes, wherein the new task 402 is in transition to a new computing node, indicated by arrow 502. According to the above mentioned modified consensus algorithm and decision protocol, it may have been decided to move the new task 402 to another computing node, e.g., the j-th computing node 210. The workload indicators may still be unchanged, especially the first workload indicator 504 of the i-th computing node 210. This parameter 502 may have a value of e.g., 10.

Figure 6:
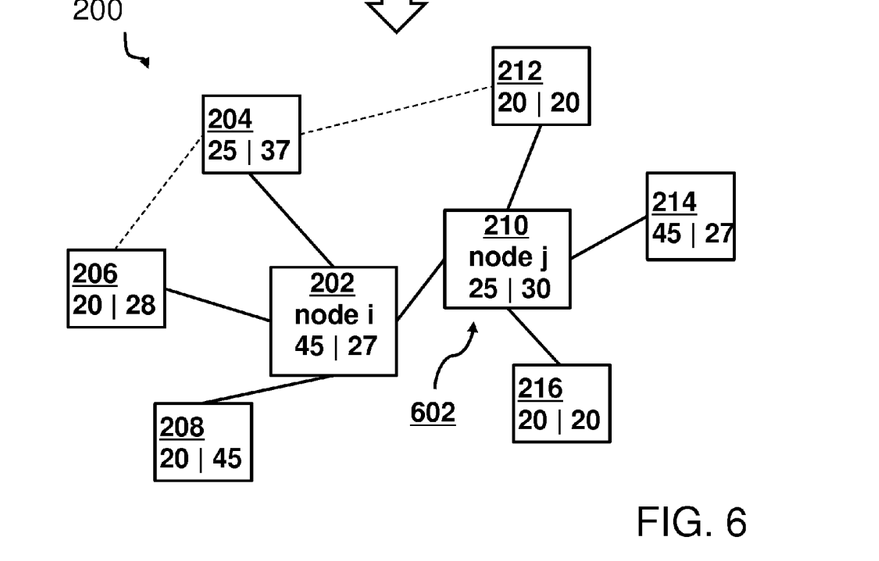
FIG. 6 shows an embodiment of a network of computing nodes, wherein the new task has been moved with new workload indicators.

FIG. 6 shows an embodiment of the same network 200 of computing nodes, wherein the new task 402 may have been moved to the new computing node 210. Here, a new first workload indicator 602 with a value of "25" is shown. Before the new task may be started, i.e., processing of the new task may begin, a check will be made identical to the initial stage. This means that computing node 210 may be in the same situation as computing node 202 at the beginning of the process. Consequently, also computing node 210 may undergo the procedure of checking whether a direct neighboring computing node may be better suited to perform the new task. This may involve also determining first workload indicators and estimated workload indicators of computing nodes 212, 214, and 216, and applying the decision protocol, as mentioned above, accordingly. Basically, the methods, as described above, may be executed again for the new computing node 210. This way, a balanced workload distribution in the network 200 of computing nodes may be reached in a very efficient way.

Figure 7:
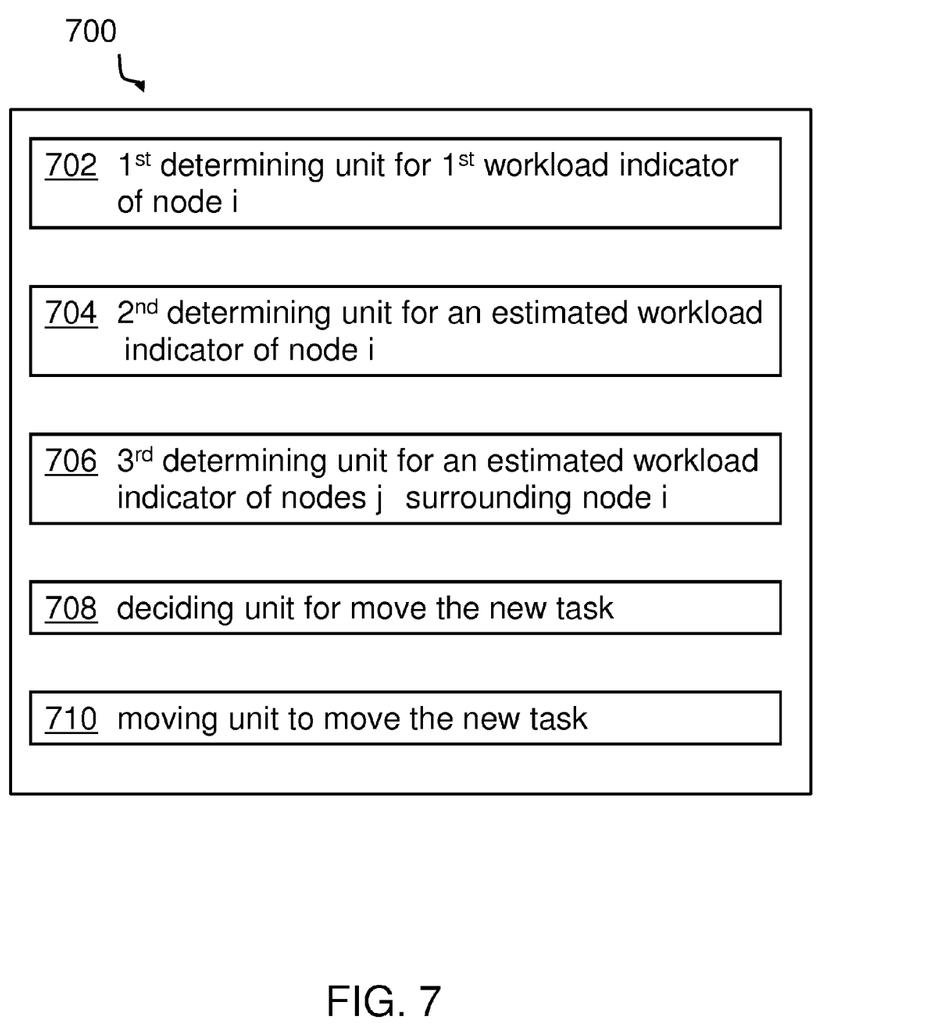
FIG. 7 shows an embodiment of a computing node with elements allowing to perform the inventive method.

FIG. 7 shows an embodiment of a computing node 700 with units allowing to perform the inventive method. In particular, a first determining unit 702 adapted to determine the first workload indicator of the i-th node is shown. Also, a second determining unit 704, adapted for determining an estimated workload indicator assuming a new task may be processed at the i-th node, is recognizable. The same applies to the third determining unit 706 which may be adapted to determine estimated workload indicators for the direct neighboring computing nodes to the i-th computing node. It may be mentioned that this determining unit 706 may determine the estimated workload indicators one after the other of the direct neighboring computing nodes. So, only one determining unit 706 may be required per node. Also shown is a decision unit 708, adapted to decide whether to move a new task to another computing node based on the modified consensus algorithm as explained above, as well as a moving unit 710.

Figure 8:
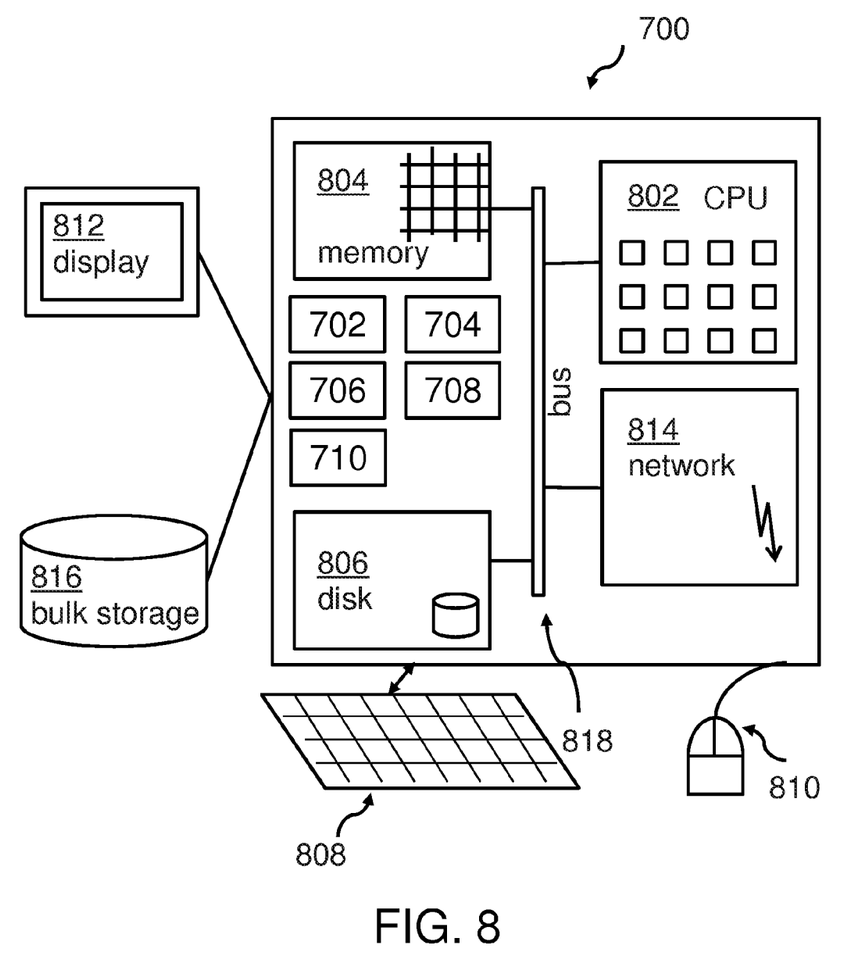
FIG. 8 shows an embodiment of a computing node additionally, with typical elements of computing systems.

Embodiments of the invention may be implemented together with virtually any type of computer, regardless of the platform being suitable for storing and/or executing program code. For example, as shown in FIG. 8, the computing system or computing node 700—besides comprising the elements 702 to 710 (see above)—may include one or more processor(s) 802 with one or more cores per processor, associated memory elements 804, an internal storage device 806 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 816 for an execution. Elements inside the computer 700 may be linked together by means of a bus system 818 with corresponding adapters. Additionally, determining units 702, 704, 706 as well as the decision unit 708 as well as the moving unit 710 may be part of the computing system 700. The units 702, 704, 706, 708, and 710 may also be connected to the bus system 818, or they may be implemented otherwise.

The computing system 700 may also include input means, such as a keyboard 808, a pointing device such as a mouse 810, or a microphone (not shown). Alternatively, the computing system may be equipped with a touch sensitive screen as main input device. Furthermore, the computer 700, may include output means, such as a monitor or screen 812 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 814. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for workload distribution in a plurality of networked computing nodes, the networked computing nodes being arranged as a connected graph defining at least one direct neighbor to each networked computing node, the method comprising:

determining a first workload indicator $x_i(k)$ of the i-th computing node out of the plurality of the networked computing nodes, at a first stage k before a new task is started by the i-th computing node;

determining an estimated workload indicator $y_i(k+1)$ of the i-th computing node if the new task is performed at a second stage k+1 on the i-th node;

determining estimated workload indicators $y_j(k+1)$, $j \leq n$, of each n direct neighbors of the i-th computing node if the new task is performed at the second stage k+1;

deciding whether to move the new task to one of the n direct neighboring computing nodes of the i-th computing node based on a decision protocol comprising:
the first workload indicator $x_i(k)$ of the i-th computing node at stage k,
the estimated workload indicator $y_i(k+1)$ of the i-th computing node at stage k+1,
the first workload indicators $x_j(k)$ of each of the direct neighboring computing nodes to the i-th computing node at stage k, and
the estimated workload indicators $y_j(k+1)$ of each of the direct neighbor computing nodes j to the i-th computing node at stage k+1; and moving the new task to one of the direct neighboring computing nodes of the i-th computing node if it is decided to move the new task such that workloads are balanced within the plurality of networked computing nodes, wherein the estimated workload indicator $y_i(k+1)$ at stage k+1 of the i-th computing node is determined by $$y_i(k+1) = \frac{1}{(n+1)(x_i(k) + \sum_{j=1}^{n} [x_j(k)])},$$

wherein
n is the number of direct neighboring computing nodes to the i-th computing node,
$x_i(k)$ is the first workload indicator of the i-th computing node at stage k,
$x_j(k)$ is the first workload indicator of one of the n direct neighboring computing nodes at stage k.

2. A method for workload distribution in a plurality of networked computing nodes, the networked computing nodes being arranged as a connected graph defining at least one direct neighbor to each networked computing node, the method comprising:

determining a first workload indicator $x_i(k)$ of the i-th computing node out of the plurality of the networked computing nodes, at a first stage k before a new task is started by the i-th computing node;

determining an estimated workload indicator $y_i(k+1)$ of the i-th computing node if the new task is performed at a second stage k+1 on the i-th node;

determining estimated workload indicators $y_j(k+1)$, $j \leq n$, of each n direct neighbors of the i-th computing node if the new task is performed at the second stage k+1;

deciding whether to move the new task to one of the n direct neighboring computing nodes of the i-th computing node based on a decision protocol comprising:
the first workload indicator $x_i(k)$ of the i-th computing node at stage k,
the estimated workload indicator $y_i(k+1)$ of the i-th computing node at stage k+1,
the first workload indicators $x_j(k)$ of each of the direct neighboring computing nodes to the i-th computing node at stage k, and
the estimated workload indicators $y_j(k+1)$ of each of the direct neighbor computing nodes j to the i-th computing node at stage k+1; and moving the new task to one of the direct neighboring computing nodes of the i-th computing node if it is decided to move the new task such that workloads are balanced within the plurality of networked computing nodes, wherein the estimated workload indicator $y_j(k+1)$ at stage k+1 of one of the direct neighboring computing nodes to the i-th computing node is determined by $$y_j(k+1) = \frac{1}{(m+1)(x_j(k) + \sum_{c=1}^{m} [x_c(k)])},$$

wherein
"m" is the number of direct neighboring computing nodes to the one of the direct neighboring computing nodes of the i-th computing node,
$x_j(k)$ is the first workload indicator of the j-th computing node which is a direct neighbor to the i-th computing node at stage "k",
xc(k) is the first workload indicator of one of m direct neighboring computing nodes to one of the direct neighboring computing nodes to the i-th computing node at stage "k".

* * * * *